W. D. HARPER.
VEHICLE BODY SUSPENSION.
APPLICATION FILED JUNE 20, 1919.
1,357,497.
Patented Nov. 2, 1920.
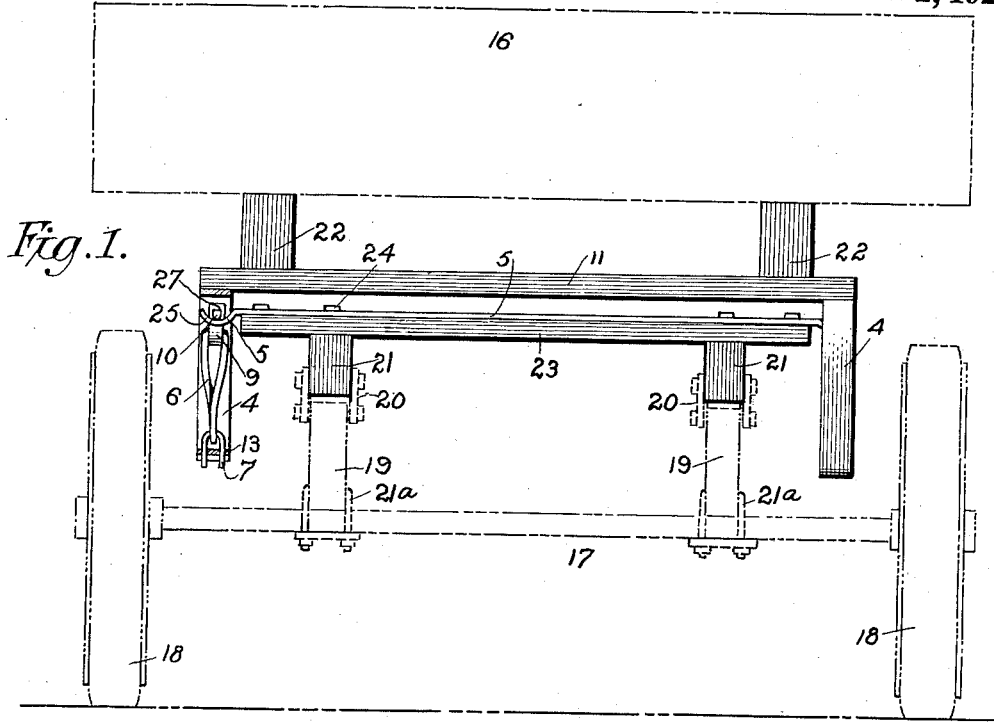
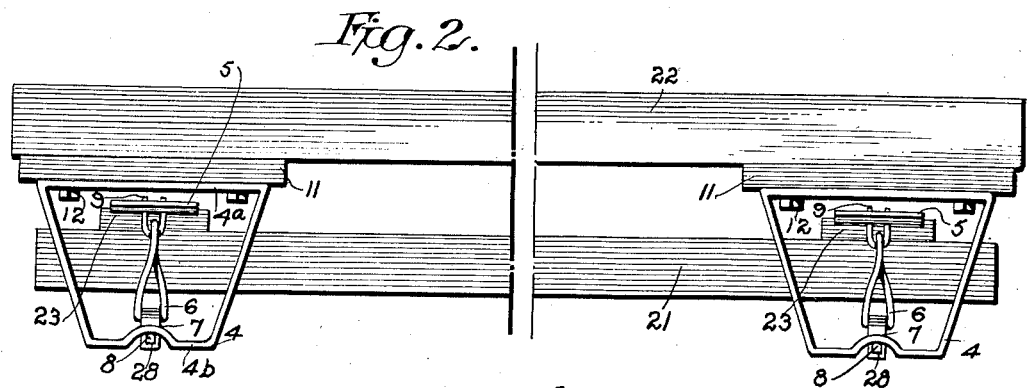
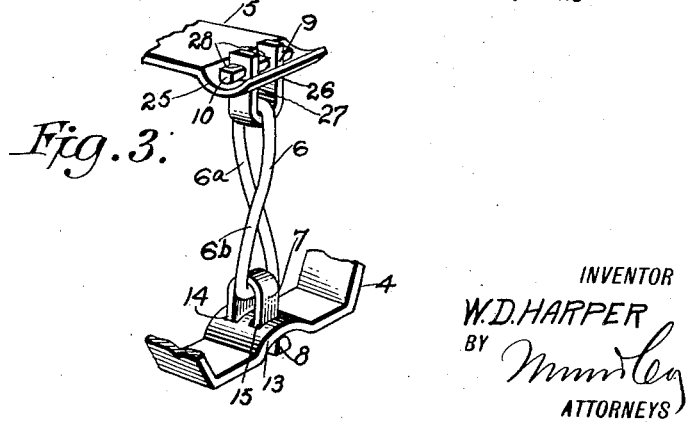
WITNESSES
INVENTOR
W.D. HARPER
BY
ATTORNEYS

UNITED STATES PATENT OFFICE.

WILLIAM DAVID HARPER, OF SAN ANTONIO, TEXAS.

VEHICLE-BODY SUSPENSION.

1,357,497.  Specification of Letters Patent.  Patented Nov. 2, 1920.

Application filed June 20, 1919. Serial No. 305,525.

*To all whom it may concern:*

Be it known that I, WILLIAM D. HARPER, a citizen of the United States, and a resident of San Antonio, in the county of Bexar and State of Texas, have invented certain new and useful Improvements in Vehicle-Body Suspensions, of which the following is a specification.

My invention relates to an automobile body suspension; and more particularly to a swing suspension for the bodies of motor trucks.

The object of my invention is to provide a body suspension for motor vehicles, particularly motor trucks, which will absorb and relieve the body and load of shocks sustained by the chassis frame.

A further object of my invention is to provide an automobile body suspension permitting of a relative limited swinging movement between the body of the vehicle and the chassis frame to absorb shocks sustained by the chassis frame.

A still further object of my invention is to provide an automobile body suspension comprising a swing connection between the body proper and the chassis frame thereof for the absorption of shocks ordinarily transmitted to the body where the latter is bolted rigidly to the chassis frame, said suspension being simple in design and construction, efficient in operation, easily adjustable, and inexpensive to manufacture.

The invention comprises novel features of design, construction and arrangement of parts, the embodiment and application of which, illustrated and described in the drawings, specification and appended claims, is the form preferred for the purposes of illustration; but it should be understood that the invention is not limited to such form and that the details and application thereof may be varied without departing from the objects and scope of the invention.

Reference is to be had to the drawings, in which similar characters of reference indicate corresponding parts throughout the several views, and in which, Figure 1 is an end view in elevation of my body suspension, in which the body of the vehicle, axle, springs and wheels are shown in diagrammatic outline.

Fig. 2 is a side view in elevation illustrating in detail the front and rear arrangement of the suspension, in this instance the suspension being four point, and particularly the method of connecting the body to the chassis frame.

Fig. 3 is a perspective view of the suspension illustrating the details of its construction.

Referring to Fig. 1 of the drawings, illustrative of the preferred embodiment of my invention, an end view of a motor truck is shown in which the body 16, axle 17, wheels 18, springs 19, spring shackles 20 connecting the springs 19 to the chassis frame 21, and clamps 21ª fastening the same to the axle 17 are shown in dotted outline.

Interposed between the body 16 and the chassis frame 21 is the construction comprising the means by which these parts are connected to permit of a relative swinging movement between them in any direction. This construction comprises body sills 22, consisting of girders or beams running longitudinally of the vehicle, to which the body 16 is secured, and which furnish the direct supporting means for the body. In turn, body sills 22 are supported by cross members or body supports 11, which may be positioned over the front and rear axles. Bolted to the chassis frame 21 are cross members or suspension bar supports 23, the longitudinal center lines of which are substantially in a perpendicular plane passing through the longitudinal center line of the body support 11 in each instance. Secured to the top of suspension bar supports 23, by means of bolts 24, are suspension bars 5, the channeled ends 25 of which, overlapping suspension bar supports 23, are provided with parallel slots 26 for the purpose hereinafter described. The channeled ends 25 of suspension bars 5 form the points from which the weight of the body 16 and the load therein contained is suspended and distributed on the chassis frame 21. Obviously the number of such suspension points may be reduced or multiplied by slight modification to suit special requirements. At each of the suspension points a swing connection is employed, the details of construction of which follow, and, as the swing connections at all suspension points are the same, it will suffice to explain the parts and adjustment of one such connection.

The swing connection comprises a bracket 4, preferably trapezoidal in form, bolted to cross member or body support 11 by means of bolts 12 through the base 4ª thereof. The center portion of base 4ᵇ of bracket 4 is arched at 13 and provided with laterally disposed slots 14 and 15, through which the branches of stirrup 7 are inserted. Near the ends of the branches of stirrup 7 are slots 28 through which the rocker pin 8 is fitted, the latter being seated in the arched portion 13 of base 4ᵇ and securing the stirrup which, normally, is in tension. Inserted through slots 26 and 27 in the channeled end 25 of suspension bar 5 is the stirrup 9, identical with the stirrup 7 above described, and it is secured in position by rocker pin 10, fitting through slots 28 near the ends of the branches of the stirrup, and seated in channel 25. It will be noted that stirrups 9 and 7 when adjusted in place are in a substantially right angular position with respect to each other. Connecting stirrups 9 and 7 is a twisted link 6, the loops 6ᵃ and 6ᵇ of which, linked with stirrups 9 and 7 respectively, are in planes approximately at right angles corresponding to the angular relation of the stirrups.

The link 6 is the connecting means between the body 16 and the chassis frame 21 at one point of the suspension. As before indicated, the total number of suspension points may be varied as desired under different conditions, a common arrangement being four. At each suspension point the swing connection is provided, and the body, consequently, is free to swing in any direction to a limited degree, relative to the chassis frame. Whenever a rut or obstruction, or sudden stopping or starting, produces a shock upon the chassis frame, the body, by virtue of its momentum or inertia, and the link connection, will swing in the direction in which the shock is transmitted and will thus be relieved of the effect which would otherwise be produced were the body rigidly secured to the chassis frame.

Having thus described my invention, I claim as new and desire to secure by Letters Patent:

1. A vehicle having a body construction and a chassis construction, said body construction being suspended from said chassis construction, and in movable and swinging relation therewith, by means, of the class described, in combination with said vehicle, comprising a body member rigidly secured to the body construction, a chassis member rigidly secured to the chassis construction, and a flexible connection between said members.

2. A vehicle having a body construction and a chassis construction, said body construction being suspended and underslung from said chassis construction, and in movable and swinging relation therewith, by suspension means, of the class described, in combination with said vehicle, comprising a body member rigidly secured to the body construction, a chassis member rigidly secured to the chassis construction, and a flexible connection between said members, said flexible connection being secured to said chassis member at a point above the point at which said connection is secured to the body member.

3. A vehicle having a body construction and a chassis construction, said body construction being suspended and underslung from said chassis construction, and in longitudinally movable and swinging relation therewith, by suspension means of the class described, in combination with said vehicle, comprising a body member rigidly secured to the body construction, a chassis member rigidly secured to the chassis construction, and a flexible connection between said members, said flexible connection comprising a plurality of links, and pins for securing said links respectively to said body member and said chassis member.

4. The combination with a vehicle, having a body and a chassis frame, of a body suspension of the class described, comprising a suspension bar support, a suspension bar, means for securing said suspension bar to said suspension bar support, a body support, a bracket, means for securing said bracket to said body support, and means for connecting said bracket to said suspension bar including a plurality of links, and means for connecting the end links to said suspension bar and said bracket.

5. The combination with a vehicle, having a body and a chassis frame, of a body suspension of the class described, comprising a suspension bar support, a suspension bar, means for securing said suspension bar to said suspension bar support, a body support, a bracket, means for securing said bracket to said body support, means for connecting said bracket to said suspension bar, including a plurality of links, and means for connecting the end links to said suspension bar and said bracket, the point of connection between said links and said bracket being below the point of connection between said links and said suspension bar.

6. The combination with a vehicle, having a body and a chassis frame, of a body suspension of the class described, comprising a suspension bar support, a suspension bar, means for securing said suspension bar to said suspension bar support, a body support, a bracket, means for connecting said bracket to said body support, means for connecting said bracket to said suspension bar, including a plurality of links, slots in said suspension bar and in said bracket for the end links, slots in said end links, and pins fitting through said slots in said end links.

WILLIAM DAVID HARPER.